(12) United States Patent
Kevenaar et al.

(10) Patent No.: US 8,410,902 B2
(45) Date of Patent: Apr. 2, 2013

(54) APPARATUSES, SYSTEM AND METHOD FOR AUTHENTICATION

(75) Inventors: Thomas A. M. Kevenaar, Eindhoven (NL); Alphons A. M. L Bruekers, Eindhoven (NL)

(73) Assignee: PRIV ID B.V., Eindhoven (NL)

( * ) Notice: Subject to any disclaimer, the term of this patent is extended or adjusted under 35 U.S.C. 154(b) by 736 days.

(21) Appl. No.: 12/600,146

(22) PCT Filed: May 8, 2008

(86) PCT No.: PCT/IB2008/051813
§ 371 (c)(1),
(2), (4) Date: Jan. 28, 2010

(87) PCT Pub. No.: WO2008/139387
PCT Pub. Date: Nov. 20, 2008

(65) Prior Publication Data
US 2010/0134246 A1   Jun. 3, 2010

(30) Foreign Application Priority Data
May 14, 2007   (EP) ..................................... 07108154

(51) Int. Cl.
*G06F 7/04*   (2006.01)
(52) U.S. Cl. ........................... 340/5.82; 340/5.1; 340/5.8
(58) Field of Classification Search ................. 340/5.82, 340/5.1, 5.81, 5.8
See application file for complete search history.

(56) References Cited

U.S. PATENT DOCUMENTS

| | | | |
|---|---|---|---|
| 6,311,272 B1 * | 10/2001 | Gressel .......................... | 713/186 |
| 6,819,219 B1 * | 11/2004 | Bolle et al. ................... | 340/5.52 |
| 7,120,607 B2 * | 10/2006 | Bolle et al. ...................... | 705/64 |
| 7,773,784 B2 * | 8/2010 | Boult ............................. | 382/124 |
| 7,925,887 B2 * | 4/2011 | Burton ........................... | 713/186 |
| 2006/0104486 A1 * | 5/2006 | Le Saint et al. ............... | 382/115 |
| 2007/0046426 A1 * | 3/2007 | Ishibashi ...................... | 340/5.52 |
| 2007/0237366 A1 * | 10/2007 | Maletsky ...................... | 382/115 |
| 2008/0304657 A1 * | 12/2008 | Tuyls et al. ..................... | 380/28 |
| 2009/0024853 A1 * | 1/2009 | Yeap et al. .................... | 713/182 |

FOREIGN PATENT DOCUMENTS

| | | |
|---|---|---|
| EP | 1 612 712 | 1/2006 |
| WO | WO 2004/104899 | 12/2004 |

OTHER PUBLICATIONS

The PCT Written Opinion of the International Searching Authority for PCT/IB2008/051813 dated Oct. 7, 2008; 6 pages.

\* cited by examiner

*Primary Examiner* — George Bugg
*Assistant Examiner* — Naomi Small
(74) *Attorney, Agent, or Firm* — Smith, Gambrell & Russell

(57) ABSTRACT

It is presented a method for authenticating a candidate individual, comprising the steps of: obtaining candidate biometric data related to the candidate individual; obtaining a first data item related to first reference biometric data from a data carrier, wherein any significant part of the first reference biometric data is not readily available from the first data item; obtaining a second data item related to the first reference biometric data from digital storage, wherein any significant part of the first reference biometric data is not readily available from the second data item; working out a second reference biometric data using the first data item and the second data item; and authenticating the candidate individual (101') when the candidate biometric data is determined to correspond to the first reference biometric data using the second reference biometric data and the candidate biometric data. Corresponding authentication apparatus, data carrier issuing apparatus and ticket are also presented.

15 Claims, 2 Drawing Sheets

US 8,410,902 B2

APPARATUSES, SYSTEM AND METHOD FOR AUTHENTICATION

CROSS-REFERENCE TO RELATED APPLICATIONS

This application is the U.S. National Phase under 35 U.S.C. 371 of International Application No. PCT/IB2008/051813 filed May 8, 2008, which claims priority from European Patent Application No. 07108154.1, filed May 14, 2007, both of which are relied on and incorporated herein by reference.

FIELD OF THE INVENTION

The present invention relates to authentication and more particularly to authentication using biometric data.

BACKGROUND OF THE INVENTION

In many applications it is desirable to personalize a ticket or an entry pass such that only the person it was issued for can use it. An important example is a boarding card, where the airline company needs to be certain what individuals have boarded any particular airplane.

In order to link a ticket or entry pass to an individual, some reference information unique for that individual (e.g. a biometric) can be stored on the ticket. Because tickets typically are low-cost objects intended for one-time use or limited times of use, and due to the data size of biometric templates, it is difficult to store complete biometric templates on a ticket.

EP 1 612 712 discloses an identification method comprising entering first and second pieces of biometric information, comparing data representative of the first piece of biometric information with stored data held in a first data store, comparing data representative of the second piece of biometric information with stored data held in a second data store and operating a device using the results of the two comparisons. One data store is conveniently a portable data store, e.g. a smart card, passports, etc.

However, using private biometric reference information on a portable data stores leads to privacy issues.

Consequently, there is a need to provide a better method and a system for authentication of an individual with a data carrier, and for use with any kind of data carrier.

SUMMARY OF THE INVENTION

In view of the above, an objective of the invention is to solve or at least reduce the problems discussed above.

Generally, the above objectives are achieved by the attached independent patent claims. A first aspect of the invention is a method for authenticating a candidate individual, comprising the steps of: obtaining candidate biometric data related to the candidate individual; obtaining a first data item related to first reference biometric data from a data carrier, wherein any significant part of the first reference biometric data is not readily available from the first data item; obtaining a second data item related to the first reference biometric data from digital storage, wherein any significant part of the first reference biometric data is not readily available from the second data item; working out a second reference biometric data using the first data item and the second data item; and authenticating the candidate individual (101') when the candidate biometric data is determined to correspond to the first reference biometric data using the second reference biometric data and the candidate biometric data.

The authenticating may involve authenticating the candidate individual (101') when a difference between the second reference biometric data and the candidate biometric data is determined to be sufficiently small.

The method may further comprise the steps, prior to the obtaining candidate biometric data, of: obtaining the first reference biometric data from a reference individual; generating the first data item and the second data item using the first reference biometric data; storing the first data item on the data carrier; and storing the second data item in the digital storage.

The step of generating the first data item and the second data item may involve: encrypting the first reference biometric data to encrypted first reference biometric data and generating the second data item comprising the encrypted first reference biometric data; and generating the first data item comprising a key for decrypting the encrypted first reference biometric data; and the step of working out first reference biometric data involves: decrypting the encrypted first reference biometric data comprised in the second data item using the key comprised in the first data item to second reference biometric data.

The step of generating the first data item and the second data item may involve: generating the second data item comprising at least part of the first reference biometric data; and generating the first data item comprising a reference to the second data item and the step of obtaining the second data item may involve: obtaining the second data item using the reference to the second data item comprised in the first data item.

The obtaining the first reference biometric data may involve generating first reference biometric data comprising a reference template derived from raw reference biometric data; and the obtaining the candidate biometric data may involve generating candidate biometric data comprising a candidate template derived from raw candidate biometric data.

The data carrier may be comprised in a ticket.

The step of obtaining a first data item may involve reading the first data item from the data carrier using a data storage technology selected from the group consisting of one-dimensional bar codes, two-dimensional bar codes, radio frequency identifier, magnetic storage, optical storage, watermark, and make-up.

A second aspect of the invention is an authentication apparatus for authenticating a candidate individual comprising: an authentication biometric reader for obtaining biometric data from a candidate individual; a data carrier reader configured to obtain a first data item related to a first reference biometric data from a data carrier, wherein any significant part of the first reference biometric data is not readily available from the first data item; and an authentication controller being configured to: obtain a second data item related to the first reference biometric data from digital storage, wherein any significant part of the first reference biometric data is not readily available from the second data item; work out a second reference biometric data using the first data item and the second data item; and authenticate the candidate individual (101') when the candidate biometric data is determined to correspond to the first reference biometric data using the second reference biometric data and the candidate biometric data.

A third aspect of the invention is a data carrier issuing apparatus comprising: a reference biometric reader configured to obtain first reference biometric data from a reference individual; a data carrier writer; and a reference controller being configured: to generate a first data item and a second data item from the first reference biometric data, wherein any significant part of the first reference biometric data is not readily available from either of the first data item or the second data item, to store the first data item on a data carrier using the data carrier writer; and to store the second data item in digital storage.

A fourth aspect of the invention is a system for authenticating a candidate individual comprising: digital storage, a data carrier issuing apparatus comprising: a reference biometric reader configured to obtain first reference biometric data from a reference individual; a data carrier writer, and a reference controller being configured: to generate a first data item and a second data item from the first reference biometric data, wherein any significant part of the first reference biometric data is not readily available from either of the first data item or the second data item, to store the first data item on a data carrier using the data carrier writer; and to store the second data item in the digital storage, and an authentication apparatus comprising: an authentication biometric reader for obtaining biometric data from a candidate individual; a data carrier reader configured to obtain the first data item related to the first reference biometric data from the data carrier; and an authentication controller being configured to: obtain the second data item related to the first reference biometric data from the digital storage; work out a second reference biometric data using the first data item and the second data item; and authenticate the candidate individual (101') when the candidate biometric data is determined to correspond to the first reference biometric data using the second reference biometric data and the candidate biometric data.

All biometric data may be related to at least one biometric selected from the group consisting of fingerprints, retina scan, iris scan, facial pattern, hand measurement and DNA.

The data carrier may be comprised in a ticket.

A fifth aspect of the invention is a ticket for holding a data carrier in a system according to the fourth aspect of the invention.

The invention thus allows storage of small first data of information on any type of storage medium. For example, the first data item can be stored on a data carrier being a ticket with a bar code or magnetic storage. Moreover, first reference biometric data is not readily available from the first data item or the second data item. In other words, the first data item on the data carrier can not be used to easily derive original first reference biometric data. This provides privacy for the reference individual who is the source of the biometric data, increasing the integrity of users of the system.

Other objectives, features and advantages of the present invention will appear from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, device, component, means, step, etc" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

Embodiments of the present invention will now be described in more detail, reference being made to the enclosed drawings, in which.

DETAILED DESCRIPTION OF EMBODIMENTS

The present invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1:
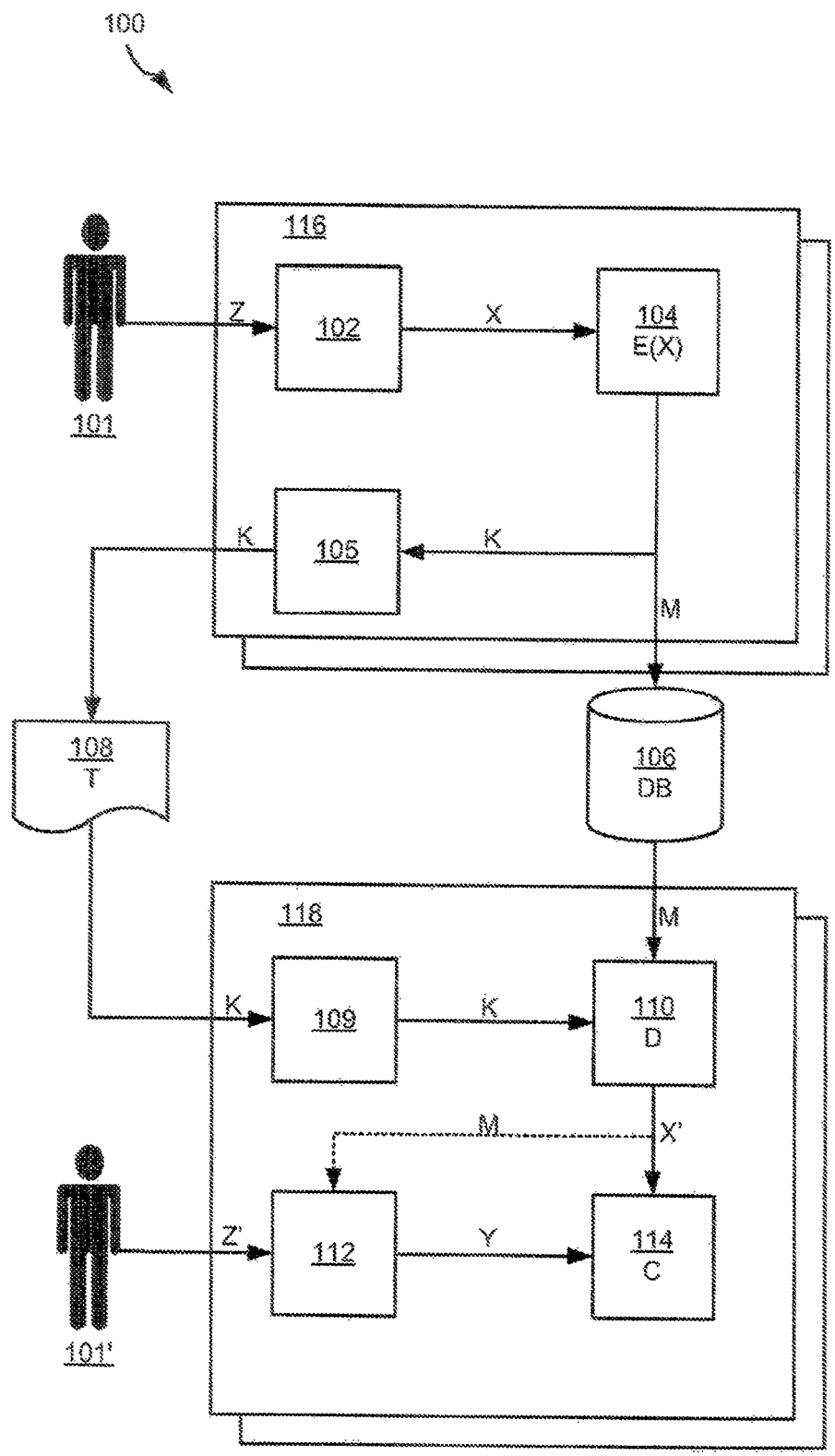
FIG. 1 shows an authentication system 100 comprising an embodiment of the present invention.

FIG. 1 shows an authentication system 100 comprising an embodiment of the present invention. A reference biometric reader 102 reads biometric data Z from a reference individual 101. The biometric reader can use any, or a combination of, known or future biometric technologies, including, but not limited to fingerprints, retina scan, iris scan, facial pattern and hand measurement. Here, X denotes information referring to a biometric of this reference individual. In one embodiment, raw biometric data is read initially, such as an image of an eye or a finger, which image is used to derive a biometric template, as is known in the art per se. Biometric data can take many forms, where one example is a fingerprint. Starting with a raw image of the finger, the image is processed into a cleaned-up image, minutiae locations are extracted (or texture is analyzed). The processed information is converted into a so-called template which might take many forms (e.g. a feature vector, set of minutiae locations, etc.). Any relevant template is then biometric data.

In data item generator 104, a first data item, also denoted K, and a second data item, also denoted M, is generated based on X. The data item generator 104 is denoted E, where E is a function whose input depends on X. The function E should be constructed such that each of K and M reveals only a limited amount of information on X. For reasons of integrity, each of K and M should not contain biometric data which can be used to verify correspondence with an individual without knowing the other of K or M.

K is sent to a data carrier writer 105 for writing K to a carrier 108, such as a ticket. The carrier data writer 105 can use any known or future technology for writing data on a carrier, for example, but not limited to, one-dimensional bar codes, two-dimensional bar codes, radio frequency identifier, magnetic storage, optical storage, watermark, make-up, etc. In one embodiment, the data carrier is a smart card. Typically, the data carrier writer is combined with or connected to a ticket writer (not shown) for writing the actual ticket 108.

The combination of the reference biometric reader 102, the data item generator 104 and the data carrier writer can be called a data carrier issuing apparatus 116.

M is written to digital storage 106. The digital storage 106 can for example be a database for storing reference information, allowing writing and reading of digital data. In one embodiment, all data carrier issuing apparatuses 116 within the authentication system 100 use the same database. Typically, each data carrier issuing apparatus 116 is installed in one ticket booth. Since all data carrier issuing apparatuses 116 are connected to the same database, it does not matter which ticket booth a reference individual 101 approaches. In a more complicated embodiment, there is more than one database. Moreover, several different systems may be used at the same time, for example using different modalities, different information and/or formats in a barcode, stripe etc. In order to solve this problem, extra information can be added to the data carrier, indicating system, modality, format, etc.

Another part of the authentication system 100 is an authentication apparatus 118. This is used to determine whether a candidate individual 101' corresponds to the reference individual 101 associated with the presented data carrier 108. A data carrier reader 109 reads K from the data carrier. The data carrier reader 109 uses a technology which is compatible to the technology used in the data carrier writer 105.

A reference biometric data regenerator 110 uses K and M to regenerate calculated reference biometrical data, here denoted X'. X' comprises at least some distinguishing aspects of X. The regeneration function is here denoted D. D is related to E in the sense that, using its inputs M and K it will output X' which contains a significant amount of information on X. M is read from digital storage 106. In the case of a complex system with a plurality of digital storages 106, the correct one is selected using K, from the data carrier 108 (T). K could then be a concatenation of data, where one part is used to generate X' and another part is used to select digital storage 106.

An authentication biometric reader 112 reads biometric data Z' from the candidate individual 101'. The reader thus provides information Y related to biometric data of the candidate individual 101'. Optionally, the authentication biometric reader 112 takes M as an input from the biometric data regenerator. This is discussed in more detail below in conjunction with helper data systems. In one embodiment, the biometric reader 112 and the data carrier 108 is comprised in one portable device.

An authenticator 114 then takes X' and Y as an input and calculates a similarity measurement between X' and Y. If the difference between X' and Y is sufficiently small, the authenticator gives a positive result and the candidate individual 101' is considered to be the same as the reference individual 101 corresponding to the ticket 108. On the other hand, if the difference is too big, a rejection message is generated.

Here follows a short example in a ticketing context. When a ticket is issued, biometric information for the intended user of the ticket is obtained, for example from a live measurement or by retrieval from a database, etc. The data carrier issuing apparatus 116 then generates K and M and stores K on the ticket T and M in the authentication system 100. When the ticket is used, biometric information Y is obtained from the candidate individual that uses the ticket, for example from a live measurement or from a biometric identity card. The information K stored on the ticket is retrieved as well as the information M stored in the authentication system 100. Next M and K are combined using D resulting in X'. As a last step, C determines the similarity between X' and Y and if they are similar enough, the authentication system 100 considers the user of the ticket to be the intended user.

In order to be useful in a ticketing context, the embodiments of the architecture should be such that K should be limited to several hundreds of bits (due to the current storage capability on tickets), K should not reveal significant information on the biometric.

Embodiments that satisfy these conditions will now be disclosed.

In one embodiment, the function E generates a random key K, independent from X, and uses this key to encrypt at least part of X, leading to M. As an example, the Advanced Encryption Standard algorithm with a 128 bit key K could be used (AES-128) such that K is small enough to store on most tickets. Clearly, K does not contain information on X because it is randomly chosen. Also, assuming that AES-128 is a proper encryption function, M also does not reveal information on X. The function D is then the AES-128 decryption function using the key K that retrieves X. The function C can be implemented as a regular matcher used in known biometric systems. In this embodiment the key may also depend on input from the user. In this set-up X=X' will hold when E and D are designed properly. If however a limited amount of noise is introduced positive identification will still be possible.

A helper data system transforms biometric templates into secure templates that reveal only a limited amount of information on the biometric that it was derived from. In general, a secure template is of the form (W, h(S)) derived using some function $F_G(Z)$, where W is the helper data, h(S) is the cryptographically hashed version of a randomly chosen secret S and Z is a representation of a biometric measurement [1,2,3]. If we assume that X is such a secure template $(W_Z, h(S_Z))$, the function E in the data item generator 104 could simply split the template in $W_Z$ and $h(S_Z)$ such that $M=W_Z$ and $K=h(S_Z)$. The function D would then, in the biometric data regenerator, 110 simply combine $W_Z$ and $h(S_Z)$, still denoted as X'. The authenticator 114 receives Y from the authentication biometric reader, where $Y=(W_Z', h(S_Z'))$, and if $h(S_Z)=h(S_Z')$, an accept message will be generated. The template Y is typically derived from a biometric measurement Z' using a fuzzy extractor function G related to $F_G$ such that $G(Z',W_Z) \approx h(S_Z)$ if Z<<Z' (see [1,2,3]).

Most cryptographic hash functions evaluate to a bit string of approximately 128 bits such that K can be stored on most tickets. Due to the properties of helper data systems, both M and K reveal only a limited amount of information on the original biometric. Alternatively, the function E could split $W_Z$ in $W_1$ and $W_2$ and define $M=(h(S),W_1)$ and $K=W_2$ such that $W_2$ is small enough to be stored on a ticket. In any case, the function C can be implemented using techniques described in, for example, [4].

In practical systems it is sometimes recommendable to extend the architecture with some extra features of which some examples are given below.

In situations where the information K does not depend on X, it is possible to use a system-wide value for K.

It is possible to give the information K and M a limited time for which it is valid.

In case privacy of the biometric information is not considered important, K can simply take the form of a pointer to the location in the database 106 where the biometric reference information is stored.

Figure 2:
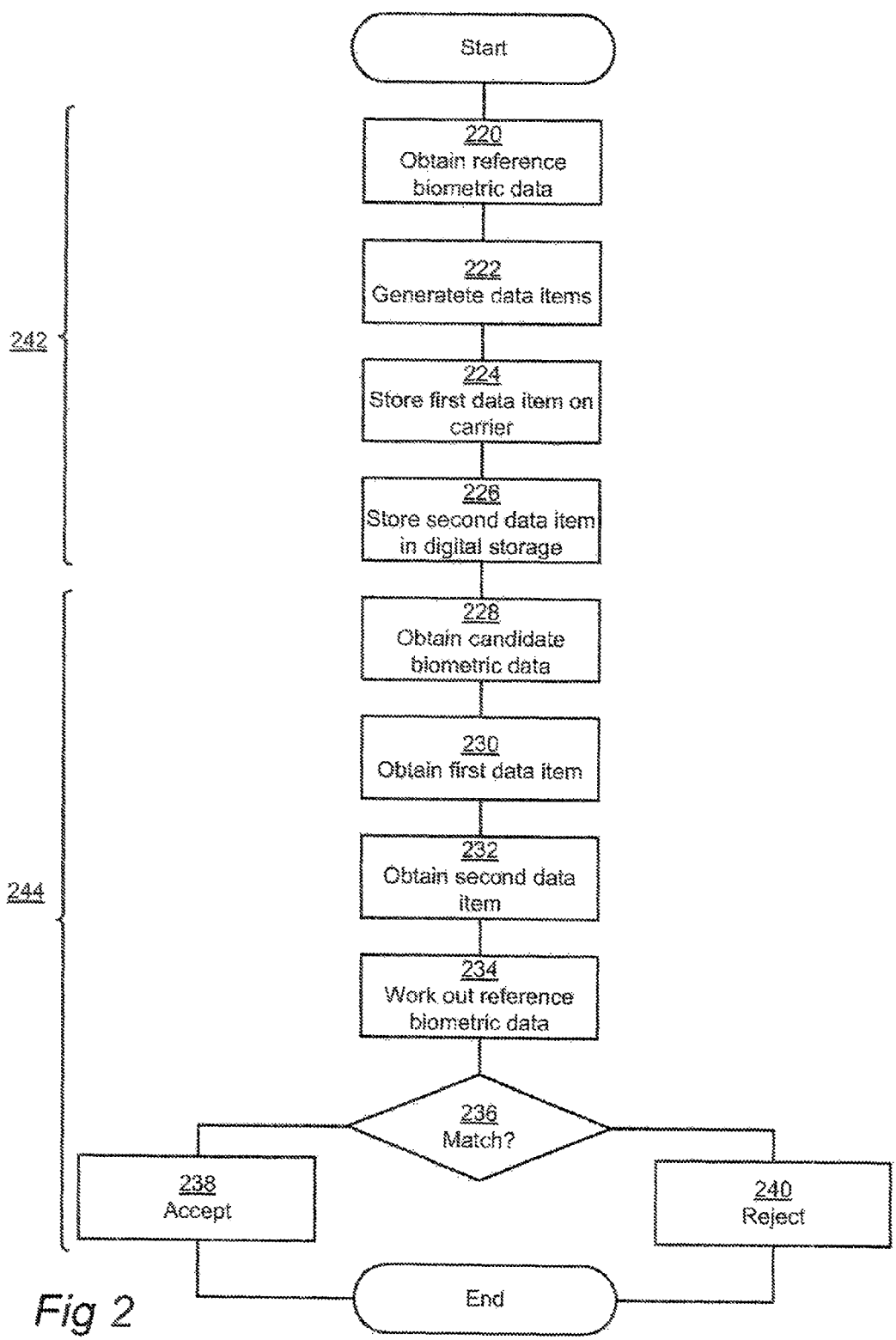
FIG. 2 is a flow chart disclosing a process which can be executed in the authentication system of FIG. 1.

FIG. 2 is a flow chart disclosing a process which can be executed in the authentication system 100 of FIG. 1.

In an initial obtain reference biometric data step 220, biometric data is obtained from a reference individual, e.g. a person buying a ticket, a person receiving a security pass, etc.

A first data item (K) and a second data item (M) is then generated in a generate data items step 222.

In the store first data item on carrier step 224, the first data item (K) is stored on a data carrier 108 (FIG. 1).

In the store second data item in digital storage step 226, the second data item (M) is stored in a database 106 (FIG. 1).

The steps 220 to 226, also denoted 242 can be performed in the data carrier issuing apparatus 116.

In an obtain candidate biometric data step 228, candidate biometric data is obtained from a candidate individual. The first data item (K) is then obtained from the data carrier 108 in an obtain first data item step 230 and the second data item (M) is retrieved from the database 106 in a obtain second data item step 232.

Once the first data K and second data M is available, reference biometric data X' is worked out in a work out reference biometric data step 234.

In a conditional match step 236, it is determined if the reference biometric data matches the candidate biometric data. If there is a match, the process continues to an accept step 238, otherwise the process continues to a reject step 240.

In the accept step 238, it is communicated that an acceptance has been determined. This can be used, e.g. to allow entrance of the candidate individual 101'.

Conversely, in the reject step 240, it is communicated that a rejection has been determined. This can for example be used to disallow entrance of the candidate individual 101.

The steps 228 to 240, also denoted 244 can be performed in the authentication apparatus 118.

The invention can be embodied in any system where authentication is needed. Non limiting examples of applicable areas are boarding cards for airplanes (where the boarding card is the data carrier 108), tickets for all purposes, e.g. entrance tickets for events and theme parks, transportation tickets (including the above mentioned boarding cards), drug prescriptions for a pharmaceutical vending machine, etc. Embodiments of the invention have the advantage that the ticket is not transferable between individuals.

The invention has mainly been described above with reference to a few embodiments. However, as is readily appreciated by a person skilled in the art, other embodiments than the ones disclosed above are equally possible within the scope of the invention, as defined by the appended patent claims.

REFERENCES

[1] J. Goseling, P. Tuyls, Information Theoretic Approach to Privacy Protection of Biometric Templates, submitted to ISIT 2004.

[2] E. Verbitskiy, P. Tuyls, D. Denteneer, J. P. Linnartz, Reliable Biometric Authentication with Privacy Protection, Benelux Symposium on Information Theory, May 2003.

[3] J. P. Linnartz, P. Tuyls, New Shielding Functions to Enhance Privacy and Prevent misuse of Biometric Templates, LNCS2688, AVBPA2003.

[4] T. A. M. Kevenaar, G. J. Schrijen, M. van der Veen, A. H. M. Akkermans, F. Zuo, Face Recognition with Renewable and Privacy Preserving Binary Templates, 4th IEEE Workshop on automatic identification advanced technology (Auto ID 2005), Oct. 17-18, 2005, Buffalo, N.Y., pp 21 25.

[5] T. Ruggles, Comparison of biometric techniques, technical report, The California State Legislature, http://biometric-consulting.com/bio.htm, April 1996. Revised May 8, 2001

The invention claimed is:

1. A method for authenticating a candidate individual (101'), comprising the steps of:
    obtaining candidate biometric data related to said candidate individual (101');
    obtaining a first data item related to a first reference biometric data from a data carrier (108), wherein any significant part of said first reference biometric data is not readily available from said first data item;
    obtaining a second data item related to said first reference biometric data from digital storage (106), wherein any significant part of said first reference biometric data is not readily available from said second data item;
    working out a second reference biometric data using said first data item and said second data item; and
    authenticating said candidate individual (101') when said candidate biometric data is determined to correspond to said first reference biometric data using said second reference biometric data and said candidate biometric data.

2. The method according to claim 1, wherein said authenticating involves authenticating said candidate individual (101') when a difference between said second reference biometric data and said candidate biometric data is determined to be sufficiently small.

3. The method according to any one of the preceding claims, further comprising the steps, prior to said obtaining candidate biometric data, of
    obtaining said first reference biometric data from a reference individual 101;
    generating said first data item and said second data item using said first reference biometric data;
    storing said first data item on said data carrier (108); and
    storing said second data item in said digital storage (106).

4. The method according to claim 3, wherein said step of generating said first data item and said second data item involves:
    encrypting at least part of said first reference biometric data to encrypted first reference biometric data and generating said second data item comprising said encrypted first reference biometric data; and
    generating said first data item comprising a key for decrypting said encrypted first reference biometric data;
    and said step of working out a second reference biometric data involves:
    decrypting said encrypted first reference biometric data comprised in said second data item using said key comprised in said first data item to second reference bio metric data.

5. The method according to claim 3, wherein said step of generating said first data item and said second data item involves:
    generating said second data item comprising at least part of said first reference biometric data; and
    generating said first data item comprising a reference to said second data item and said step of obtaining said second data item involves:
    obtaining said second data item using said reference to said second data item comprised in said first data item.

6. The method according to any one of claims 3 to 5, wherein:
    said obtaining said first reference biometric data involves generating first reference biometric data comprising a reference template derived from raw reference biometric data; and
    said obtaining said candidate biometric data involves generating candidate biometric data comprising a candidate template derived from raw candidate biometric data.

7. The method according to any one of the preceding claims, wherein said data carrier (108) is comprised in a ticket.

8. The method according to any one of the preceding claims, wherein said step of obtaining a first data item involves reading said first data item from said data carrier using a data storage technology selected from the group consisting of one-dimensional bar codes, two-dimensional bar codes, radio frequency identifier, magnetic storage, optical storage, watermark, and make-up.

9. The method according to any one of the preceding claims, wherein said step of obtaining said second data item from digital storage (106), involves selecting a digital storage from a plurality of digital storages, based on data source information related to said first data item.

10. An authentication apparatus (118) for authenticating a candidate individual (101') comprising:
    an authentication biometric reader (112) for obtaining biometric data from a candidate individual (101');

a data carrier reader (109) configured to obtain a first data item related to a first reference biometric data from a data carrier (108), wherein any significant part of said first reference biometric data is not readily available from said first data item; and an authentication controller being configured to:
obtain a second data item related to said first reference biometric data from digital storage (106), wherein any significant part of said first reference biometric data is not readily available from said second data item;
work out a second reference biometric data using said first data item and said second data item; and
authenticate said candidate individual (101') when said candidate biometric data is determined to correspond to said first reference biometric data using said second reference biometric data and said candidate biometric data.

11. A data carrier issuing apparatus comprising:
a reference biometric reader configured to obtain first reference biometric data from a reference individual;
a data carrier writer; and
a reference controller being configured;
to generate a first data item and a second data item from said first reference biometric data,
wherein any significant part of said first reference biometric data is not readily available from either of said first data item or said second data item,
to store said first data item on a data carrier using said data carrier writer; and
to store said second data item in digital storage.

12. A system (100) for authenticating a candidate individual (101') comprising:
digital storage (106),
a data carrier issuing apparatus (116) comprising:
a reference biometric reader (102) configured to obtain first reference biometric data from a reference individual (101);
a data carrier writer; and
a reference controller being configured:
to generate a first data item and a second data item from said first reference biometric data, wherein any significant part of said first reference biometric data is not readily available from either of said first data item or said second data item,
to store said first data item on a data carrier (108) using said data carrier writer; and
to store said second data item in said digital storage (106), and
an authentication apparatus (118) comprising:
an authentication biometric reader (112) for obtaining biometric data from a candidate individual (101');
a data carrier reader (109) configured to obtain said first data item related to said first reference biometric data from said data carrier (108); and
an authentication controller being configured to:
obtain said second data item related to said first reference biometric data from said digital storage (106);
work out a second reference biometric data using said first data item and said second data item; and
authenticate said candidate individual (101') when said candidate biometric data is determined to correspond to said first reference biometric data using said second reference biometric data and said candidate biometric data.

13. The system (100) according to claim 12, wherein all biometric data is related to at least one biometric selected from the group consisting of fingerprints, retina scan, iris scan, facial pattern, hand measurement and DNA.

14. The system (100) according to claim 12 or 13, wherein said data carrier (108) is comprised in a ticket.

15. A ticket for holding a data carrier (108) in a system (100) according to any one of claims 12 to 14.

* * * * *